United States Patent Office 3,476,772
Patented Nov. 4, 1969

3,476,772
CHROMAN DERIVATIVES OF 2,5-DIMETHYL-2,4-HEXADIENE
Vinton A. Hoyle, Jr., and Wayne V. McConnell, Kingsport, Tenn., assignors to Eastman Kodak Company, Rochester, N.Y., a corporation of New Jersey
No Drawing. Filed Oct. 20, 1966, Ser. No. 587,976
Int. Cl. C07d 7/32; A61k 15/02
U.S. Cl. 260—345.5     4 Claims

ABSTRACT OF THE DISCLOSURE

Certain novel chroman derivatives have been found to be highly effective as antioxidants. The novel chroman derivatives are 4-isopropyl-2,2-dimethyl-7-($C_1$–$C_8$ alkyl)-6-hydroxychromans.

---

This invention relates to new antioxidants. More particularly it involves novel chroman derivatives of 2,5-dimethyl-2,4-hexadiene.

Lee Irvin Smith, in Chemical Reviews 27, 300 (1940) discloses reaction of certain dienes with substituted hydroquinones. At page 302 of the same article Smith suggests that the reaction is first by 1,4-addition of an acidic catalyst (proton), the intermediate thus formed then "allylating" the aromatic nucleus without rearrangement, followed by ring closure. This would give as an end product, if 2,5-dimethyl-2,4-hexadiene is the diene reacted, a 2-isopropyl-4,4-dimethyl-7-substituted-6-hydroxychroman. We have found surprisingly that instead of the 2-isopropyl-4,4-dimethyl-7-substituted-6-hydroxychroman, our final product is a 4-isopropyl-2,2-dimethyl-7-substituted-6-hydroxychroman. Furthermore, for some reason unknown to us at present this novel substituted chroman is of substantially higher effectiveness as an antioxidant, for example, in lard, gasoline, vitamin A or the like than alpha-tocopherol and heretofore known 6-hydroxychromans.

The novel 4-isopropyl-2,2-dimethyl-7-substituted-6-hydroxychroman of our invention can be represented by the structural formula

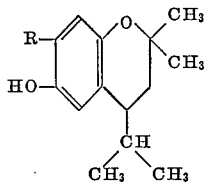

wherein R is straight or branched-chain alkyl, preferably containing 1–8 carbon atoms. Preferred alkyls include tertiary butyl, 1,1,3,3-tetramethylbutyl, and octyl. We have confirmed this structure by NMR spectra wherein multiplets were observed around 2.70 p.p.m., putting the H atom

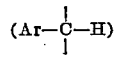

at the 4 position. The substituted group in the 7-position comes from the substituted group in the hydroquinone reacted with the diene to give our novel chromans. Thus, the reaction for preparing our novel 6-hydroxychromans can be represented by the following equation wherein R is as described hereinabove.

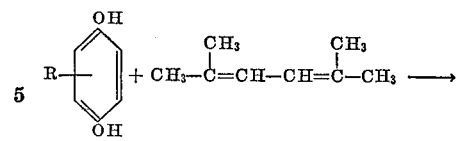

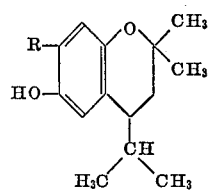

According to our preferred procedure, the substituted hydroquinone is dissolved in acetic acid and a catalytic amount of a Lewis acid catalyst such as zinc chloride added (1–10% by weight based on the weight of the solution). Then 2,5-dimethyl-2,4-hexadiene is added keeping the reaction temperature at between 30 and 120° C. until the reaction subsides. Then several drops of concentrated sulfuric acid are added to facilitate the cyclization. The product is then isolated.

The product is water-insoluble and stable under ordinary conditions. It can be incorporated directly in the material to be stabilized or first dissolved in a solvent. It can also be used in conjunction with other antioxidants, synergists, or metal scavengers. Preferred amount is 0.001 to 1.0% by weight of the compositions in which used. Some useful components which can be used in conjunction therewith are propyl gallate, nordihydroguaiaretic acid (NDGA), phosphoric acid, citric acid, beta,beta'-thiodipropionic acid, ascorbic acid, and the like.

The following examples illustrate the invention.

EXAMPLE I

Preparation of 4-isopropyl-2,2-dimethyl-7-tert-butyl-6-hydroxychroman

To a mixture of acetic acid (40 ml.), t-butylhydroquinone (10.7 g., 0.065 mole), and 1 g. of zinc chloride was added 2,5-dimethyl-2,4-hexadiene (7.1 g., 0.065 mole) over a 2-hour period. During the addition and for 1 hr. thereafter the reaction mixture was maintained at 60° C. Then concentrated sulfuric acid (2 drops) was added and heating continued for 5 minutes. The mixture was added to 200 ml. of water. On cooling a light yellow solid formed. The solid weighed 17 g. after drying. A portion of the solid was recrystallized from aqueous ethanol giving a white solid, M.P. 146–9° C.

Analysis.—Calcd. for $C_{18}H_{28}O$: C, 78.2; H, 10.2. Found: C, 78.3; H, 10.0.

EXAMPLE II

Preparation of 4-isopropyl-2,2-dimethyl-7-(1,1,3,3-tetramethylbutyl)-6-hydroxychroman A mixture of acetic acid (100 ml.), (1,1,3,3-tetramethylbutyl) hydroquinone (22.2 g., 0.1 mole), 2,5-dimethyl-2,4-hexadiene (16.5 g., 0.15 mole) and zinc chloride (2 g.) was reacted in a manner similar to that described in Example I. After purification there was obtained 19 g. of white solid, M.P. 149–151° C.

Analysis.—Calcd. for $C_{22}H_{36}O_2$: C, 79.5; H, 10.9. Found: C, 79.4; H, 10.9.

EXAMPLE III

Preparation of 4-isopropyl-2,2-dimethyl-7-octyl-6-hydroxychroman

The procedure of Example I was used to prepare 4-isopropyl - 2,2 - dimethyl - 7 - octyl - 6 - hydroxychroman, M.P. 81.0–82.5° C.

EXAMPLE IV

The oxygen bomb stability test described in Industrial and Engineering Chemistry (Ind. Ed.), 24, 1375 (1932) was used to evaluate the antioxidant of Example I in gasoline. 4-isopropyl-2,2-dimethyl - 7 - tert-butyl - 6 - hydroxychroman was incorporated at a concentration of 0.01% in the various gasolines listed in Table 1 which follows. The induction periods of gasolines containing the substituted chroman were compared with the induction period of the corresponding gasolines containing 0.01% of 2,6-di-tert-butyl-p-cresol (Tenamene 3) and were superior by a factor of 1.5 to 2.0 (see Table I).

TABLE 1

Effectiveness of 4-isopropyl-2,2-dimethyl-7-tert-butyl-6-hydroxychroman as a gasoline antioxidant Gasoline used: Inhibitor ratio
Esso Cat.+Therman cracked naphtha
  (No. 169) _____ 1.71
Indiana Farm Bureau Premium (No. 112) ____ 1.54
Gulf No-Nox base stock (No. 163) _____ 2.06

EXAMPLE V

The effectiveness of 4-isopropyl-2,2-dimethyl-7-tert-butyl-6-hydroxychroman as an antioxidant in fats and oils was determined by the Active Oxygen Method (AOM). The chroman was tested in lard at concentration levels of 0.01 and 0.02%. The data in Table 2 below indicate this antioxidant to be an effective stabilizer for lard.

TABLE 2

Effectiveness of 4-isopropyl-2,2-dimethyl-7-tert-6-hydroxychroman as an antioxidant in lard Hours to reach peroxide value of 20 Meq.
Control, SL–76 _____ 9
0.01% product from Example I _____ 28
0.02% product from Example I _____ 35
0.02% butylated hydroxyanisole _____ 45

EXAMPLE VI

The test procedure described by our co-workers B. N. Stuckey, E. R. Sherwin, and F. D. Hannah, Jr., in J. Am. Oil Chemist's Soc., 35, 581 (1958) was used to test the antioxidant effect of our 4-isopropyl-2,2-dimethyl-7-substituted-6-hydroxychroman in pastry. Pastry was made from lard containing the amount of antioxidant shown in Table 3 below. The pastry was baked at 425° for 16 minutes. Then a 30 g. sample of the pastry was placed in a 1–1 bomb and the bomb heated at 100° C. under a pressure of 100 p.s.i. of oxygen. When oxygen was consumed by the sample, the pressure inside the bomb dropped and that time was recorded in the table. The pressure drop represents a failure of the antioxidant in the pastry. The control pastry lasted 6.25 hrs. while 4-isopropyl-2,2-dimethyl-7-tert-butyl - 6 - hydroxychroman stabilized the pastry at least as well as butylated hydroxyanisole, a commercial antioxidant having good carry-through properties.

TABLE 3

Carry-through properties of 4-isopropyl-2,2-dimethyl-7-tert-butyl-6-hydroxychroman in pastry Oxygen bomb test in hours
Control, pastry _____ 6.25
0.01% product from Example I _____ 21.25
0.02% product from Example I _____ 31.75
0.01% butylated hydroxyanisole _____ 23.5
0.02% butylated hydroxyanisole _____ 33.75
Lard used: SL–77.

EXAMPLE VII

Representative 4-isopropyl-2,2-dimethyl-7-substituted-6-hydroxychromans of this invention were compared with other chromans for their antioxidant effect when used in lard. The following compounds were tested with results shown in Table 4, which follows:

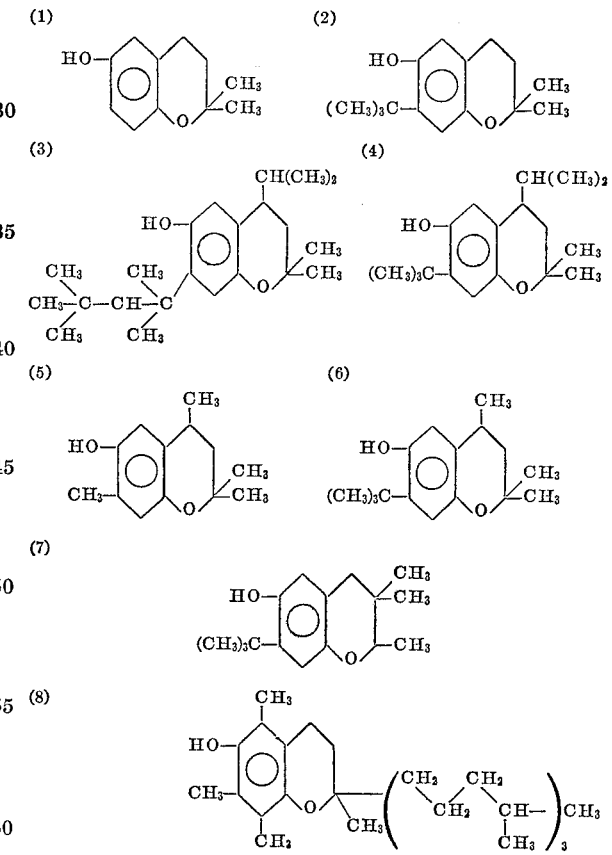

TABLE 4.—EFFECTIVENESS OF ANTIOXIDANTS IN LARD

| Antioxidant Concentration | Time (hr.) for Lard to Reach Peroxide Value of 20 Meq. "Effective Lifetime" Given by Figure in Parentheses ( ) | | |
|---|---|---|---|
| | 0.005% | 0.01% | 0.02% |
| Control lard | 5 | 5 | 5 |
| (1) 2,2,-dimethyl-6-hydroxychroman | 16(3.2) | 22(4.4) | 26(5.2) |
| (2) 2,2-dimethyl-7-tert-butyl-6-hydroxy-chroman | 19(3.8) | 26(5.2) | 33(6.6) |
| (3) 2,2-dimethyl-4-isopropyl-7-(1,1,4,4-tetramethyl-butyl)-6-hydroxychroman | 28(5.6) | 34(6.8) | |
| (4) 2,2-dimethyl-4-isopropyl-7-tert-butyl-6-hydroxychroman | 30(6.0) | 40(8.0) | |
| (5) 2,2,4,7-tetramethyl-6-hydroxychroman | | | 4.5(0.9) |
| (6) 2,2,4-trimethyl-7-tert-butyl-6-hydroxychroman | | | 7(1.7) |
| (7) 2,2,3-trimethyl-7-tert-butyl-6-hydroxychroman | | | 7(1.7) |
| (8) Alpha-tocopherol | | 15(3.0) | |

The results in Table 4 show that Compounds 3 and 4, which are representative of our invention, impart an unexpectedly high degree of stability to lards. All the compounds listed in the table are similar in structure, and they can be classified as alkyl substituted 6-hydroxychromans. In comparison with the two subject compounds, viz, 3 and 4, Compounds 1, 2, 5, 6 and 7 have lower molecular weights and therefore would have been expected to have a higher antioxidant activity on an equal weight basis. In comparing the effective stabilization lifetimes (obtained by dividing the lifetime of the stabilized lard by the lifetime of the control lard), it is observed that Compounds 3 and 4 are superior antioxidants. For example, at 0.005% concentration Compound 3 stabilizes the lard for 5.6 lifetimes, Compound 4 for 6.0 lifetimes, Compound 1 for only 3.2 and Compound 2, 3.8. At twice the concentration Compound 8 increases the lifetime by only 1.7. The high degree of activity shown by Compounds 3 and 4 is surprising in view of the similar structure of all the compounds tested. For example, the difference between Compounds 2 and 4 is simply an isopropyl group in the 4 position in Compound 4. Compound 6 is also similar to Compound 4, the difference again being this isopropyl group in the 4 position in Compound 4, Compound 6 having a methyl group instead. This points out a highly desirable feature of our invention, viz, the use of readily available 2,5-dimethyl-2,4-hexadiene as the compound to be reacted with substituted hydroquinone to give the novel stabilizers of our invention.

EXAMPLE VIII

The effectiveness of 2,2-dimethyl-4-isopropyl-7-tert-butyl-6-hydroxychroman in the stabilization of yellow grease is shown in the following table (Table 5).

stabilizes yellow grease approximately two times longer than does 7-butyl-2,2,4-trimethyl-6-hydroxychroman and approximately four times as long as Santoquin, a stabilizer now being used as an animal food stabilizer. When .05% citric acid is added, the antioxidant of this example stabilizes yellow grease 22 times longer than Santoquin.

EXAMPLE IX

This example illustrates antioxidant stabilization of vitamin A (acetate form) with 4-isopropyl-2,2-dimethyl-7-tert-butyl-6-hydroxychroman. In Table 6, hereinafter, the antioxidant index is given for vitamin A stabilized with 4-isopropyl-2,2-dimethyl-7-tert-butyl-6-hydroxychroman and for several prior art compounds of related structure. The representative 4-isopropyl-2,2-dimethyl-7-substituted-6-hydroxychroman of the instant invention is shown to be of equal or superior antioxidant capability. The common names and the structural formulas for each compound tested are given in the table. The antioxidant index for each compound at given concentrations was calculated by determining, from plotting the other data in the table, the time required to cause 25% vitamin A loss for each composition, using the following formula:

$$\frac{\text{Time to 25\% decomposition for sample}}{\text{Time to 25\% decomposition for blank (no antioxidant)}}$$

The general procedure for obtaining the data other than antioxidant index in Table 6 was as follows:

Stock solutions were prepared containing vitamin A acetate, hydrogenated lard, and antioxidant in chloroform such that when 0.2 ml. portions were spotted onto a whatman #1 filter paper and evaporated, the residue would consist of 12 mg. of a 2% solution of vitamin A in hydrogenated lard, containing alpha-tocopherol at

TABLE 5.—ANTIOXIDANT EFFECT ON AOM STABILITY OF YELLOW GREASE

| Treatment | Time (hr.) Required for Grease to Become Rancid | |
|---|---|---|
| | 0.01% Antioxidant | 0.01% Antioxidant plus 0.05% Citric Acid |
| None | 2 | 30 |
| 6-ethoxy-2,2,4-trimethyl-1,2-dihydroquinoline (Santoquin) | 8 | 8 |
| 7-tert-butyl-2,2,4-trimethyl-6-hydroxychroman | 16 | 61 |
| 2,2-dimethyl-4-isopropyl-7-tert-butyl-6-hydroxychroman | 32 | 176 |

Antioxidant effectiveness was measured by the Active Oxygen Method (AOM). Animal feed stabilization is an important and growing field. One ingredient of feeds that has poor stability is yellow grease. Currently, 5 billion pounds per year of yellow grease are used in animal feeds. It should be noted that the subject antioxidant levels of 0, .02, .1, .5%, and the analogs at equivalent percentages on a molar basis. Several papers of each concentration were prepared and stored at room temperature in the dark (oven). Samples were assayed for vitamin A at intervals by ultraviolet absorption of chloroform eluates of the papers.

TABLE 6

| Antioxidants | Concentration, Percent | Percent Recovery of Vitamin A at Room Temp. after— | | | | |
|---|---|---|---|---|---|---|
| | | 18 hrs. | 22 hrs. | 40 hrs. | 46 hrs. | 64 hrs. |
| Alpha-tocopherol | 0.5 | | 92 | | 83 | 65 |
| [structure: HO-, H₃C- substituted chroman with -CH₂CH₂-CH₂-CH(CH₃)-]₃-CH₃, CH₃, CH₃, CH₃ groups] | | | | | | |
| Geranyl analog | Equiv. (0.33) | | 84 | | 73 | 48 |
| [structure: HO-, H₃C- substituted chroman with CH₂CH₂CH=C(CH₃)-CH₃, CH₃, CH₃, CH₃ groups] | | | | | | |

TABLE 6—Continued

| Antioxidants | Concentration, Percent | Percent Recovery of Vitamin A at Room Temp. after— | | | | |
|---|---|---|---|---|---|---|
| | | 18 hrs. | 22 hrs. | 40 hrs. | 46 hrs. | 64 hrs. |
| Methyl analog | Equiv. (0.25) | 88 | | 85 | | 54 |
| Chroman of this invention | Equiv. (0.32) | 88 | | 85 | | 74 |
| Alpha-tocopherol | 0.1 | 88 | | 64 | | 38 |
| Geranyl analog | Equiv. (0.067) | 93 | | 62 | | 42 |
| Methyl analog | Equiv. (0.05) | 93 | | 71 | | 31 |
| Alpha-tocopherol | 0.02 | 64 | 36 | | | |
| Geranyl analog | Equiv. (0.13) | 59 | 33 | | | |
| Methyl analog | Equiv. (0.01) | 53 | 24 | | | |

| | Percent Recovery After— | | | |
|---|---|---|---|---|
| | 2 Hours | 4 Hours | 5 Hours | 18 Hours |
| None (Blank) | 93 | 75 | 63 | 0 |

| Compound | Antioxidant Index at— | | |
|---|---|---|---|
| | 0.5% or equiv. | 0.1% or equiv. | .02% or equiv. |
| Alpha-tocopherol | 13 | 7.5 | 4 |
| Geranyl analog | 10 | 8 | 4 |
| Methyl analog | 12 | 9 | 4 |
| Chroman of this invention | 16 | | |

A similar comparison was made using ethoxyquin and alpha-tocopherol, this time for comparative purposes. The chroman of this invention used was again 2,2-dimethyl-4-isopropyl-7-tert-butyl-6-hydroxychroman. Results are given in Table 7 which follows.

uses for our novel 4-isopropyl-2,2-dimethyl-7-substituted-6-hydroxychromans, see Ser. No. 452,889 of our co-workers Lestina and Reckow, now U.S. Patent No. 3,432,300, issued Mar. 11, 1969.

TABLE 7

| Antioxidant | Concentration, percent | Percent Recovery After— | | | | |
|---|---|---|---|---|---|---|
| | | 18 Hrs. | 24 Hrs. | 44 Hrs. | 48 Hrs. | 66 Hrs. |
| Alpha-tocopherol | 0.5 | | 89 | 58 | 60 | 42 |
| Chroman of this invention | Equiv. (0.32) | | 96 | 82 | 84 | 60 |
| Ethoxyquin | Equiv. (0.25) | | 96 | 95 | 82 | 44 |
| alpha-Tocopherol | 0.1 | 68 | 58 | 35 | | |
| Chroman of this invention | Equiv. (0.064) | 84 | 65 | 38 | | |
| Ethoxyquin | Equiv. (0.05) | 81 | 54 | 26 | | |

| | Percent Recovery After— | | | |
|---|---|---|---|---|
| | One Hour | Two Hours | 3 Hours | 4 Hours |
| None (Blank) | 98 | 82 | 62 | 36 |

| Compound | Antioxidant Index at — | |
|---|---|---|
| | 0.5% or equiv. | 0.1% or equiv. |
| Alpha-tocopherol | 17 | 7.0 |
| Ethoxyquin | 24 | 9.5 |
| Chroman of this invention | 24 | 9.5 |

The use of 2,5-dimethyl-2,4-hexadiene according to our invention is particularly advantageous in several ways. For example, it is readily available and can be made in good yield from easily obtained starting materials. One method of preparation is shown in U.S. Patent 3,157,716 to co-inventor Hoyle and co-worker Davis. For further Although the invention has been described in considerable detail with particular reference to certain preferred embodiments thereof, variations and modifications can be effected within the spirit and scope of the invention as described hereinabove, and as defined in the appended claims.

We claim:
1. A compound of the formula

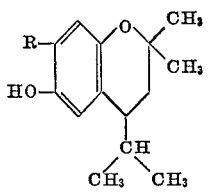

wherein R is a straight or branched-chain alkyl radical having 1 to 8 carbon atoms.

2. The compound of claim 1 wherein R is tertiary butyl.

3. The compound of claim 1 wherein R is 1,1,3,3-tetramethylbutyl.

4. The compound of claim 2 wherein R is octyl.

References Cited

UNITED STATES PATENTS

| 2,421,811 | 6/1947 | Smith et al. | 260—345.5 |
| 3,026,330 | 3/1962 | Folkers et al. | 260—345.5 |
| 3,395,158 | 7/1968 | Miller et al. | 260—345.5 |

OTHER REFERENCES

Smith et al., J. Org. Chem., vol. 4, pp. 311–17 (1939).
Smith, Chemical Reviews, vol. 27, pp. 299–306 (1940).

HENRY R. JILES, Primary Examiner
JOHN M. FORD, Assistant Examiner

U.S. Cl. X.R.

44—63; 99—163; 252—407; 424—344

PO-1050
(5/69)

UNITED STATES PATENT OFFICE
CERTIFICATE OF CORRECTION

Patent No. 3,476,772     Dated November 4, 1969

Inventor(s) Vinton A. Hoyle, Jr. and Wayne V. McConnell

It is certified that error appears in the above-identified patent and that said Letters Patent are hereby corrected as shown below:

Column 9, Claim 4, (corresponding to Claim 5 in the application) should be dependent on Claim 1 rather than Claim 2.

SIGNED AND
SEALED
FEB 24 1970

(SEAL)
Attest:

Edward M. Fletcher, Jr.
Attesting Officer

WILLIAM E. SCHUYLER, JR.
Commissioner of Patents